US008577772B2

(12) United States Patent
Heckman et al.

(10) Patent No.: US 8,577,772 B2
(45) Date of Patent: Nov. 5, 2013

(54) SYSTEM AND METHOD FOR GENERATING LIQUIDITY

(75) Inventors: Chris Heckman, New York, NY (US); Eric Sugden, New York, NY (US); Jerome Provensal, New York, NY (US); Greg Watmore, New York, NY (US)

(73) Assignee: ITG Software Solutions, Inc., Culver City, CA (US)

( * ) Notice: Subject to any disclaimer, the term of this patent is extended or adjusted under 35 U.S.C. 154(b) by 1519 days.

(21) Appl. No.: 11/259,363

(22) Filed: Oct. 27, 2005

(65) Prior Publication Data

US 2006/0136326 A1   Jun. 22, 2006

Related U.S. Application Data

(60) Provisional application No. 60/622,019, filed on Oct. 27, 2004.

(51) Int. Cl.
*G06Q 40/00* (2012.01)

(52) U.S. Cl.
CPC ..................................... *G06Q 40/00* (2013.01)
USPC ....................................................... 705/36 R

(58) Field of Classification Search
USPC ................. 705/1, 35, 36 R, 37, 38
See application file for complete search history.

(56) References Cited

U.S. PATENT DOCUMENTS

| | | | |
|---|---|---|---|
| 3,573,747 A | 4/1971 | Adams | |
| 4,412,287 A | 10/1983 | Braddock, III | |
| 4,674,044 A | 6/1987 | Kalmus et al. | |
| 4,903,201 A | 2/1990 | Wagner | |
| 5,077,665 A | 12/1991 | Silverman et al. | |
| 5,101,353 A | 3/1992 | Lupien et al. | |
| 5,136,501 A | 8/1992 | Silverman et al. | |
| 5,297,031 A | 3/1994 | Gutterman et al. | |
| 5,375,055 A | 12/1994 | Togher et al. | |
| 5,497,317 A | 3/1996 | Hawkins et al. | |

(Continued)

FOREIGN PATENT DOCUMENTS

| JP | 2002-366746 A | 12/2002 |
|---|---|---|
| JP | 2004-528658 A | 9/2004 |

(Continued)

OTHER PUBLICATIONS

Microsoft Press Computer Dictionary, Third Edition, 1997, p. 456.

(Continued)

*Primary Examiner* — Bruce I Ebersman
(74) *Attorney, Agent, or Firm* — Rothwell, Figg, Ernst & Manbeck, P.C.

(57) ABSTRACT

A system for generating liquidity includes a plurality of client user interfaces and a matching system. Each client user interface includes a trading desktop which stores unexecuted trading positions. The matching system is coupled with the plurality of client user interfaces and configured to receive information about the unexecuted trading positions. The system can identify as a match one or more first indications of interest which can fulfill one or more second indications of interest, based upon the information about the unexecuted trading positions. For the identified matches, the system can provide a notification of the match and an invitation to execute the match to corresponding client user interfaces. When an invitation is accepted, the system forwards an order to an order execution system for execution.

17 Claims, 12 Drawing Sheets

(56) References Cited

U.S. PATENT DOCUMENTS

| | | | |
|---|---|---|---|
| 5,592,375 A | | 1/1997 | Salmon et al. |
| 5,615,269 A | | 3/1997 | Micali |
| 5,664,115 A | | 9/1997 | Fraser |
| 5,689,652 A | | 11/1997 | Lupien et al. |
| 5,715,402 A | | 2/1998 | Popolo |
| 5,717,989 A | | 2/1998 | Tozzoli et al. |
| 5,727,165 A | | 3/1998 | Ordish et al. |
| 5,787,402 A | | 7/1998 | Potter et al. |
| 5,794,207 A | | 8/1998 | Walker et al. |
| 5,794,219 A | | 8/1998 | Brown |
| 5,809,483 A | | 9/1998 | Broka et al. |
| 5,818,914 A | * | 10/1998 | Fujisaki .................. 379/93.12 |
| 5,835,087 A | | 11/1998 | Herz et al. |
| 5,842,178 A | | 11/1998 | Giovannoli |
| 5,845,266 A | | 12/1998 | Lupien et al. |
| 5,873,071 A | | 2/1999 | Ferstenberg et al. |
| 5,897,620 A | | 4/1999 | Walker et al. |
| 5,924,082 A | | 7/1999 | Silverman et al. |
| 5,924,083 A | | 7/1999 | Silverman et al. |
| 5,926,801 A | | 7/1999 | Matsubara et al. |
| 5,950,176 A | | 9/1999 | Keiser et al. |
| 5,950,177 A | | 9/1999 | Lupien et al. |
| 6,012,046 A | | 1/2000 | Lupien et al. |
| 6,014,627 A | | 1/2000 | Togher et al. |
| 6,029,146 A | | 2/2000 | Hawkins et al. |
| 6,029,195 A | | 2/2000 | Herz |
| 6,055,504 A | | 4/2000 | Chou et al. |
| 6,058,379 A | | 5/2000 | Odom et al. |
| 6,112,189 A | | 8/2000 | Rickard et al. |
| 6,131,087 A | | 10/2000 | Luke et al. |
| 6,134,535 A | | 10/2000 | Belzberg |
| 6,141,653 A | | 10/2000 | Conklin et al. |
| 6,157,918 A | | 12/2000 | Shepherd |
| 6,195,647 B1 | | 2/2001 | Martyn et al. |
| 6,247,000 B1 | | 6/2001 | Hawkins et al. |
| 6,266,652 B1 | * | 7/2001 | Godin et al. .................. 705/37 |
| 6,278,982 B1 | | 8/2001 | Korhammer et al. |
| 6,313,833 B1 | | 11/2001 | Knight |
| 6,401,080 B1 | | 6/2002 | Bigus et al. |
| 6,408,282 B1 | | 6/2002 | Buist |
| 6,418,419 B1 | | 7/2002 | Nieboer et al. |
| 6,421,653 B1 | | 7/2002 | May |
| 6,493,683 B1 | | 12/2002 | David et al. |
| 6,505,174 B1 | | 1/2003 | Keiser et al. |
| 6,505,175 B1 | | 1/2003 | Silverman et al. |
| 6,704,716 B1 | | 3/2004 | Force |
| 6,747,692 B2 | * | 6/2004 | Patel et al. .................. 348/211.2 |
| 6,968,318 B1 | | 11/2005 | Ferstenberg et al. |
| 7,035,819 B1 | * | 4/2006 | Gianakouros et al. .......... 705/37 |
| 7,136,834 B1 | | 11/2006 | Merrin et al. |
| 7,315,840 B1 | * | 1/2008 | Keith .......................... 705/37 |
| 7,565,313 B2 | * | 7/2009 | Waelbroeck et al. .......... 705/37 |
| 7,627,516 B2 | * | 12/2009 | Gianakouros et al. .......... 705/37 |
| 7,769,668 B2 | * | 8/2010 | Balabon .......................... 705/37 |
| 7,912,780 B2 | * | 3/2011 | Cleary Neubert et al. ...... 705/37 |
| 2001/0037284 A1 | | 11/2001 | Finkelstein et al. |
| 2001/0047323 A1 | | 11/2001 | Schmidt |
| 2002/0007335 A1 | | 1/2002 | Millard et al. |
| 2002/0032632 A1 | | 3/2002 | Sernet |
| 2002/0052824 A1 | | 5/2002 | Mahanti et al. |
| 2002/0055901 A1 | | 5/2002 | Gianakouros et al. |
| 2002/0099646 A1 | | 7/2002 | Agarwal et al. |
| 2002/0099647 A1 | | 7/2002 | Howorka et al. |
| 2002/0128955 A1 | | 9/2002 | Brady et al. |
| 2003/0004859 A1 | | 1/2003 | Shaw et al. |
| 2003/0014354 A1 | | 1/2003 | Madoff et al. |
| 2003/0050888 A1 | | 3/2003 | Satow et al. |
| 2003/0061069 A1 | | 3/2003 | Silverman et al. |
| 2003/0093362 A1 | | 5/2003 | Tupper et al. |
| 2003/0120585 A1 | * | 6/2003 | Rosenblatt ................. 705/37 |
| 2003/0216932 A1 | | 11/2003 | Foley |
| 2003/0220868 A1 | | 11/2003 | May |
| 2003/0229563 A1 | | 12/2003 | Moore et al. |
| 2003/0229566 A1 | | 12/2003 | Moore et al. |
| 2004/0034591 A1 | | 2/2004 | Waelbroeck et al. |
| 2004/0059666 A1 | * | 3/2004 | Waelbroeck et al. .......... 705/37 |
| 2004/0172356 A1 | | 9/2004 | Agarwal et al. |
| 2004/0199453 A1 | | 10/2004 | Brady et al. |
| 2005/0114254 A1 | | 5/2005 | Condie |
| 2005/0197857 A1 | | 9/2005 | Avery |
| 2005/0234805 A1 | | 10/2005 | Robertson et al. |
| 2006/0015446 A1 | | 1/2006 | Burkhardt et al. |
| 2006/0026090 A1 | | 2/2006 | Balabon |
| 2006/0031153 A1 | | 2/2006 | Kim |
| 2006/0059082 A1 | | 3/2006 | Silverman et al. |
| 2006/0080220 A1 | | 4/2006 | Samuel et al. |
| 2006/0085317 A1 | | 4/2006 | Allen |
| 2006/0089899 A1 | | 4/2006 | Durkin et al. |

FOREIGN PATENT DOCUMENTS

| | | |
|---|---|---|
| JP | 2004-287893 A | 10/2004 |
| WO | WO 00/70518 | 11/2000 |
| WO | WO 01/25996 | 4/2001 |
| WO | 02/097589 A2 | 12/2002 |

OTHER PUBLICATIONS

J. Davis: "Big Storm Rising," Business 2.0, Sep. 1, 1998, 2 pages.
A. Svaidi: "Wall Street Turns to Durango for Help," Denver Business Journal, Jan. 30, 1998, 3 pages.
LEXSEE 1991 SEC No-Act. Lexis 1112, Oct. 1, 1991, 16 pages.
Victor Kulkosky, "Making Connections in Off-Exchange Trading," Wall Street & Technology, New York, Oct. 1993, vol. 11, Iss. 5, p. 14, 4 pgs.
Peter Chapman, "Merrin's Solution to Liquidity Problems," Traders Magazine, Oct. 2000, vol. 13, Iss. 173, p. 54, 3 pgs.
Mary Schroeder, "Liquidnet to Build Interfaces With Four OMSs," Securities Industry News, Nov. 2000, vol. 12, Iss. 43, p. 5, 1 pg.
Anthony Guerra, "Will Liquidnet Catch the Buy Side," Wall Street & Technology, Jul. 2001, 19, 7, p. 75, 3 pgs.
www.liquidnet.com "Have a Change", Why Use Liquidnet: Features & Benefits, 5 pages.
E-mail string containing an e-mail dated Jun. 19, 1998 from Eric Legoff to James Nikolai transmitting the Proposal to Jeffries & Company, Inc.
Vie Systems, Inc.: "Proposal to Jeffries & Company, Inc.," Jun. 19, 1998, pp. 1-16.
K. Lupowitz: "Merrin (DOS)/Harborside Installation Guide," Jul. 28, 1998, 7 pages.
T. Tarrant: "@Harborside Links Demonstrate New Paradigm as Leading Order Management and Network Vendors Connect," Jul. 12, 1999, 3 pages.
Translation of Japanese Office Action, issued in JP 2007-539144 on Nov. 22, 2011, 6 pages.

* cited by examiner

FIG. 2B

| Include | Ticker | Side | Available | Order Size |
|---|---|---|---|---|
| ☑ | ~~MSFT~~ | ~~Buy~~ | ~~50,000~~ | ~~50,000~~ |
| ☑ | ~~MOT~~ | ~~Buy~~ | ~~62,750~~ | ~~62,750~~ |
| ☑ | ~~T~~ | ~~Buy~~ | ~~90,000~~ | ~~90,000~~ |
| ☑ | ~~PFE~~ | ~~Buy~~ | ~~35,000~~ | ~~35,000~~ |
| ☑ | ~~GE~~ | ~~Sell~~ | ~~74,000~~ | ~~74,000~~ |

5 orders swept from the OMS

FIG. 21

| ! | Include | Ticker | Side | Available | Order Size |
|---|---------|--------|------|-----------|------------|
|   | ☑ | MSFT | Buy | 25,000 | 25,000 |
|   | ☑ | MDT | Buy | 52,750 | 52,700 |
|   | ☑ | T | Buy | 90,000 | 90,000 |
| 🔔 | ☑ | PFE | Buy | 35,000 | 35,000 |
| ↑ | ☑ | GE | Sell | 74,000 | 74,000 |

Trading Scenario

| | | BUY | | | SELL | | | MARKET | |
|---|---|---|---|---|---|---|---|---|---|
| | Time | Buy Type | Indic Size | Triact Size | Triact Size | Indic Size | Sell Type | Bid | Offer |
| (1) | 10:15:55 | Buy Indic | 100,000 | | | | | | |
| (2) | 10:22:55 | Buy Indic | 100,000 | | | 40,000 | Sell Indic | | |
| (3) | 10:23:18 | Buy Indic | 100,000 | | 40,000 (1) | | Sell Conf | | |
| (4) | 10:23:39 | Buy Conf | | 100,000 (1) | | | | | |
| (5) | 10:24:00 | | | X 40,000 28.43 | | | | 28.42 x 28.44 | |
| (6) | 10:24:01 | Buy Indic | 60,000 | | | | | | |

1. Buy Indication arrives
2. Sell Indication arrives, Users alerted to potential cross
3. Seller converts indication to order
4. Buyer converts indication to order
5. Mid-point cross
6. Buyer residual reverts to indication

FIG. 3

Trading Scenario

| | Time | BUY | | | SELL | | | MARKET | |
|---|---|---|---|---|---|---|---|---|---|
| | | Buy Type | Indic Size | Triact Size | Triact Size | Indic Size | Sell Type | Bid | Offer |
| (1) | 10:02:12 | | | | 50,000 (2) | | Sell Triact | | |
| (2) | 10:15:55 | Buy Indic | 100,000 | | | | | | |
| (3) | 10:22:55 | | 100,000 | | 40,000 (3) | 40,000 | Sell Indic | | |
| (4) | 10:23:18 | | 100,000 | | | | | | |
| (5) | 10:23:39 | Buy Conf | | 100,000 (1) | | | Sell Conf | | |
| (6) | 10:24:00 | | | X 90,000 28.43 | | | | | |
| (7) | 10:24:01 | Buy Indic | 10,000 | | | | | 28.42 x 28.44 | |

1. 50,000 shares from 2 orders in Triton
2. Buy Indication arrives
3. Sell Indication arrives, Users alerted to potential cross
4. Seller converts indication to order
5. Buyer converts indication to order
6. Mid-point cross
7. Buyer residual reverts to indication

FIG. 4

SYSTEM AND METHOD FOR GENERATING LIQUIDITY

CROSS-REFERENCE TO RELATED APPLICATIONS

The present application claims the benefit of priority to U.S. Provisional Patent Application Ser. No. 60/622,019 filed on Oct. 27, 2004, the entire contents of which are hereby incorporated by reference.

BACKGROUND OF THE INVENTION

1. Field of the Invention

The present invention relates generally to trading systems. More particularly, the present invention relates systems and methods of generating liquidity by indicating interests in trading assets. More particularly, according to embodiments of the present invention, a confidential, anonymous matching system and method provides a means for matching indications of interest and executing orders based on the matches, thereby increasing the liquidity of an order execution system.

2. Description of the Related Art

Institutions trading large blocks of securities are faced with significant inefficiencies in the markets as a consequence of the markets' focus on retail traders. Such inefficiencies have led to enormous costs in executing institutional trades. Institutional traders cannot share their entire order size information with the markets without causing an adverse impact on the share price.

Recently, some institutions have turned to the use of "indications of interest" (IOs) to seek out liquidity. Typically a broker receiving a large block from an institutional customer would attempt to find a natural other side to the transaction to avoid a trade imbalance on the primary exchanges and reduce market impact. Matching systems are known in the prior art for identifying potential counterparties to a transaction. See, e.g., U.S. Pat. No. 5,924,082 to Silverman et al. In the Silverman system, traders use subjective criteria, such as a party's credit rating, geographic location, political affiliation, or other subjective criteria, to filter out unacceptable trading parties. The users of the system enter subjective ranking information for all other users, who are identified to each user in a display. A user then enters bid/offer information together with minimum rank information that represents the lowest rank of any potentially acceptable counterparty to the transaction entered by the user. A matching computer then matches bids and offers entered based on the bid/offer parameters and the ranking information. Once potential matches are identified, the matching computer signals the potential counterparties to enable the parties to communicate with each to commence direct negotiations.

The use of such "indications of interest" systems has certain advantages in that it is relatively easy to participate in an indication of interest pool, and traders maintain complete control over their orders. However, the current systems have significant shortcomings, in that 1) information leakage can occur through the negotiation process, which could result in adverse price impact; 2) negotiations frequently can be lengthy and cumbersome, and may not even result in a trade being transacted; 3) the liquidity pool is not diverse; and 4) transactions are limited to two parties.

Thus, there is a need for improved systems and methods for generating liquidity utilizing indications of interest.

SUMMARY OF THE INVENTION

According to the present invention, systems and methods are provided wherein indications of interest are used to seek out additional liquidity, while full anonymity is preserved and information leakage is avoided.

According to an embodiment of the present invention, unexecuted trading positions may be used as indications of interest, and the corresponding party, trader, etc. may be alerted to the existence of potential indication crosses or matches. The corresponding party, trader, etc. then, for a limited period of time, may convert or "promote" the indication of interest to a "firm" order. The alert maintains anonymity and confidentiality regarding the identity of the trader and the size of the indication of interest. A matching algorithm is then used for share allocation and pricing at which the transactions will occur.

According to an embodiment of the present invention, the system is configured to take non-executable orders or indications of interests, such as an indication to buy or sell an amount of a tradable asset (e.g., a number of shares of a given security), and match indications of interest with a contra trade (i.e., a corresponding indication of interest having the opposing side). As will be described in further detail below, a matching algorithm may be configured to consider multi-party trades (e.g., three-way) and other complex ways of matching indications of interest.

A system for generating liquidity according to an embodiment of the present invention a plurality of client user interfaces and a matching system. Each client user interface includes a trading desktop which stores unexecuted trading positions. The matching system is coupled with the plurality of client user interfaces and configured to receive information about the unexecuted trading positions. The system can identify as a match one or more first indications of interest which can fulfill one or more second indications of interest, based upon the information about the unexecuted trading positions. For the identified matches, the system can provide a notification of the match and an invitation to execute the match to corresponding client user interfaces. When at least one invitation on each side of the match is accepted, the system forwards orders corresponding to the match, to an order execution system for execution.

According to another embodiment of the present invention, a method for generating liquidity includes the steps of: receiving a plurality of indications of interest to trade an amount of a tradable asset; identifying as a match, one or more first indications of interest from the plurality of indications of interest which can fulfill one or more second indications of interest from the plurality of indications of interest; for the match, providing an invitation to execute the match to each party corresponding to the one or more first indications of interest and one or more second indications of interest; and if at least one invitation on each side of a match is accepted, generating an executable order corresponding to the accepted one or more first indications of interest and the accepted one or more second indications of interest in order to execute a trade of a tradable asset.

According to one embodiment, when an invitation is accepted, an order is generated base on the indication of interest and submitted to the order execution system. However, if, during the window of time for accepting the match, no contra-party orders are accepted, or the order is otherwise not crossed, the order expires and the indication of interest is reset. That is, it reverts back to the client and can be resubmitted as in indication of interest.

Further applications and advantages of various embodiments of the present invention are discussed below with reference to the drawing figures.

BRIEF DESCRIPTION OF THE DRAWINGS

FIGS. 2a-2i are screen shots of an exemplary interface for a system for creating liquidity according to an embodiment of the present invention.

FIG. 3 illustrates a trading scenario according to an embodiment of the present invention.

FIG. 4 illustrates another trading scenario according to an embodiment of the present invention.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
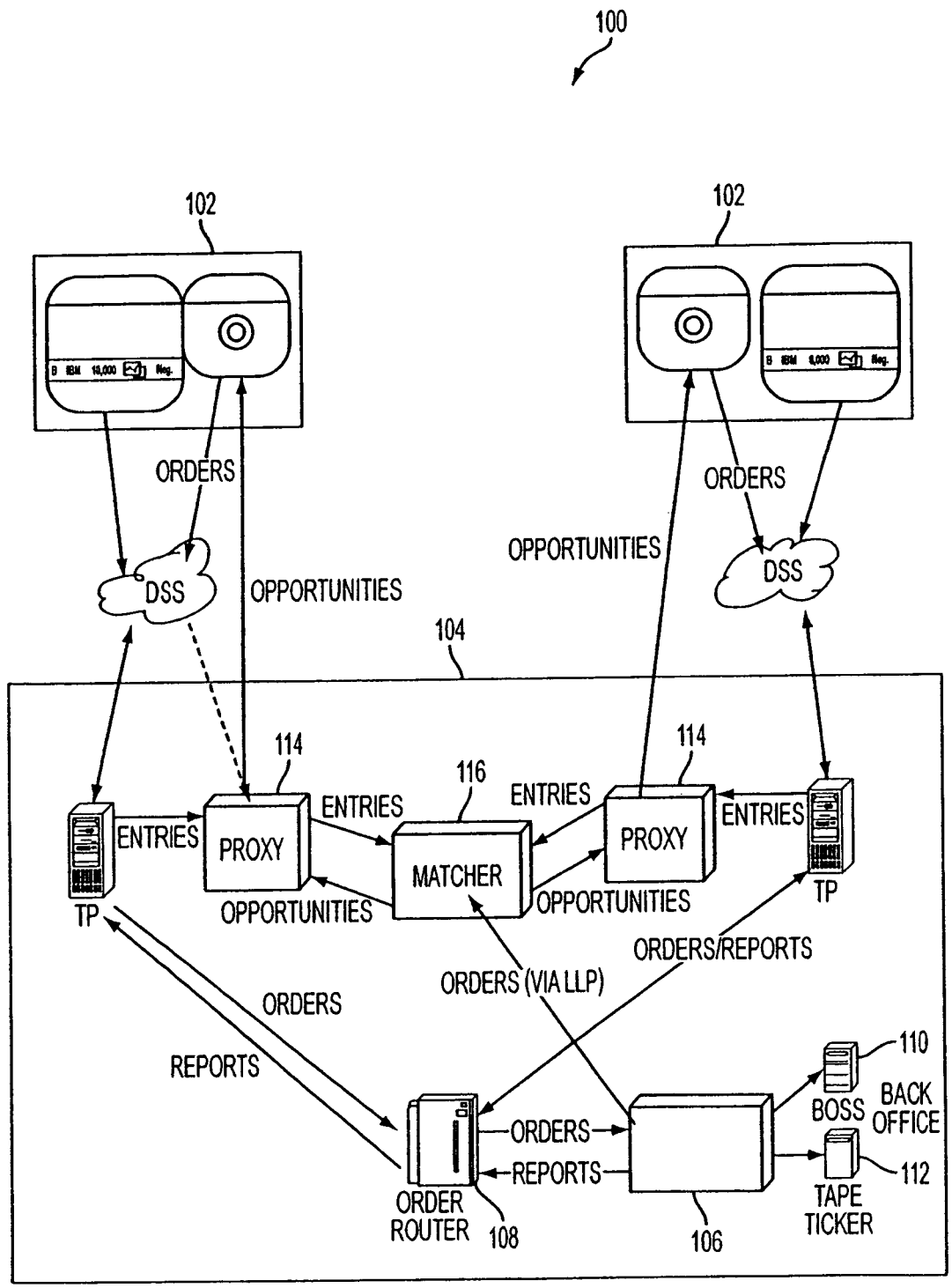
FIG. 1 is a block diagram of a system for creating liquidity according to an embodiment of the present invention.

FIG. 1 is a block diagram of a system according to an embodiment of the present invention. The system 100 includes a number of clients 102 which are connected to a trading system 104. Each client 102 can be a trading desktop and comprises appropriate hardware (e.g., PC) and software. The trading desktop may include one or more trading interfaces (for example, TRITON® and CHANNEL™, by ITG Inc.) for entering and monitoring trades for execution, order management system (OMS), and other system that manages target trading positions. Trading positions are usually stored in a data base and viewed with an interface, usually called a "blotter."

Clients 102 may be connected with the trading system 104 via an electronic data network, direct connection, etc. Trading system 104 may be connected to a number of trading entities, such as exchanges, ECNs, or the like, for receiving trading information, and routing and executing trades. Trading system 104 preferably includes an order execution system 106, which may be a crossing system for executing orders. For example, ITG Inc. owns U.S. Pat. No. 5,873,071. Trading system 104 also preferably includes an order routing system 108 for routing live orders for execution. The system may be connected to a back office system 110 or a ticker tape or other reporting system 112. The system 104 may include appropriate hardware and software for performing encryption, security and connective, such as, for example, proxy servers 114.

The system also includes a matching module 116 for matching indications of interests and converting matches to firm orders as described in more detail below. Indications of interest are preferably kept confidential and anonymous even when a match occurs. The system 104 includes a pricing module (which may be a part of matching module 116) that calculates a price for executing matched indications. Preferably, the pricing module uses a mid-point pricing algorithm.

In order to create a "pool" of indications, the system 100 may be configured to scan each client 102 for uncommitted positions or certain committed yet unexecuted positions (collectively, "indications") that could result in a match against contra-side indications of another client 102 and/or a contra-side order, which may be residing on some other system. This scanning is sometimes called "sweeping." Sweeping may occur at the client 102 or be controlled remotely (e.g., by matching module 116), depending on the configuration and where blotter data is stored. Alternatively, a means for manually entering indications to the pool could be provided. Once indications are swept, the information can be stored locally and provided to the matching module 116, or stored at the matching module 116, or in a separate memory storage unit (not shown).

According to the invention, "sweeping" can be performed in a number of ways. On some periodic basis, the system can take a slice from a trading desktop blotter and send it to the match pool as an 101 order. Some possible options include:
- Sweep all uncommitted shares. Uncommitted shares are shares not committed to a broker in the OMS.
- Sweep a percentage of the uncommitted shares.
- Sweep all or a percentage of the shares committed to a particular broker.
- Sweep at a fixed rate (e.g., every N seconds, minutes, etc.).

Optionally, a user could be prompted after the sweep to confirm the submission of the indications before sending it to the match pool.

Matching module 116 is configured to access the indications pool and match contra-indications with each other. Once contra-indications are matched, the matching module 116 is configured to notify each party to the match and provide a means for accepting the match. When a match is accepted, the matching module converts the match into executable orders and enters the orders into the order execution system 106. The price of the order is determined by the pricing algorithm (preferable, the mid-point for the asset).

A number of filters or conditions can be utilized for determining when a match exists or when a client 102 is notified of the existence of a match. For example, whether a client 102 will be alerted to the existence of a possible match can be made dependent upon the potential size of an indication. Take the case of a stock with a 21-day average daily trading value of $1,000,000 or more, the system might be configured to generate an alert for a match only when it has an available position of 25,000 shares or more in that security. For positions in securities with lower 21-day average daily trading values, the position could be limited to those greater than 10,000 for the client 102 to be alerted of a match.

When system detects the possibility of a match for a particular security meeting the applicable alert threshold, the system will send an electronic notification to the affected client 102 informing them that a possible match exists. Preferably, the notification will merely identify the security involved and the side (buy, sell) of the market of the indication. It is usually important to maintain the anonymity of the parties and the confidence of the size and trading constraints of an indication in order to prevent impact on market, gaming, etc. Therefore, it is most preferred that the system will not identify the contra-side parties, the potential size of the transaction, or any other details or trading constraints applicable to the contra-side order or indication.

Once a client 102 receives the notification of a potential match, that client preferably has a set-period (e.g., 45 seconds) to respond to the notification or the match expires. By responding to the notification within this time frame, each of the parties' indications are converted to orders that are submitted to the order execution system 106 for participation in the next match of orders. The indication in the client's trading desktop remains an uncommitted position during this time-window until the client responds to the notification and accepts the match. Until the client accepts the match, the client remains free to ignore the notification and/or send an order relating to that position elsewhere.

Also, an indication of interest may be matched with an order. In this case, orders could be made "indications eligible," such as by adding a parameter to the order, which would allow the system to consider those orders for its matching indications pool. Order execution system 106 could "push" eligible orders to the matching module 116, or the matching module 116 could sweep indication eligible orders from the order execution system 106, to include those orders in the matching indications pool. One should recognize that the price of such indications eligible orders should be considered during matching in order to avoid generating false matches.

If a client does not respond to the electronic notification within the response time-window, it will be notified that a potential match opportunity was missed. The client may subsequently elect to reactivate the indication. As an option, the position can be excluded from consideration for future matching opportunities within the system until it is reactivated.

At the time of converting an indication into an order for submission to the order execution system 106 (i.e., responding within the notification window), the client may elect to specify a period of time (time-in-force) in which any uncrossed portion of that order will remain in execution system 106 as an order, during which time it can potentially interact with other orders. If the order has not been completely filled, the unfilled portion is returned to matching module 116 or to the client user 102, where it may revert to an indication of interest.

Synchronization between order execution systems and the conversion process may be required in order to ensure that the converted indication is crossed. In such cases, when a client is notified of a trading opportunity (alert) for a particular security (with the contra side being another client or an Indication-eligible order), crossing in that security in order execution system 106 can be suspended until the earlier of the following: (a) all clients receiving alerts have responded by sending accepting matches, or (b) the alert response window has expired. This mechanism permits a client user, if it responds to the notification within the allotted time, to participate in a match against any order in the order management system 106 on the contra side of the market without fear that the contra side order(s) would become unavailable through a cross with an existing or intervening order on the same side of the market as the user.

All orders matched within the order execution system 106 are executed at a price between the national best bid and offer at the time of the match (e.g., mid-point), thereby providing price improvement for all contra-parties involved in the match. The exact execution price for orders matched within the system and, correspondingly, the amount of price improvement received by a party to a match, can depend on various factors.

It should be understood that FIG. 1 is not meant to be a limiting configuration and the features and components thereof may vary. For example, matching can be performed at each client 102 and matches could be directly entered into the order execution system from the participating clients. It will also be understood that the components of FIG. 1 can be implemented with appropriate computer hardware and software to support the functionality and connectivity of the system and method of the present invention. Preferably, state of the art computer hardware and programming technique will be used to implement the present invention. Further, any computer architecture may be used. That is, functions may be centralized, object oriented, or distributed, and it is not intended that each logical component must be implemented as separate equipment.

FIGS. 2a-2i are screen shots of an exemplary client user interface (e.g., graphical user interface (GUI)). By way of example, a system and method according to an embodiment of the present invention will be described with reference to the screen shots. The example of FIGS. 2a-2e are screen shots of a client user interface made and marketed by ITG Inc. POSIT Alert is a trademark owned by ITG Inc. Further, it should be understood that actions within the client interface are described with reference to the client interface, but processing can be performed as described with reference to FIG. 1 above. Typical GUI navigation techniques are assumed to be understood.

Figure 2A:
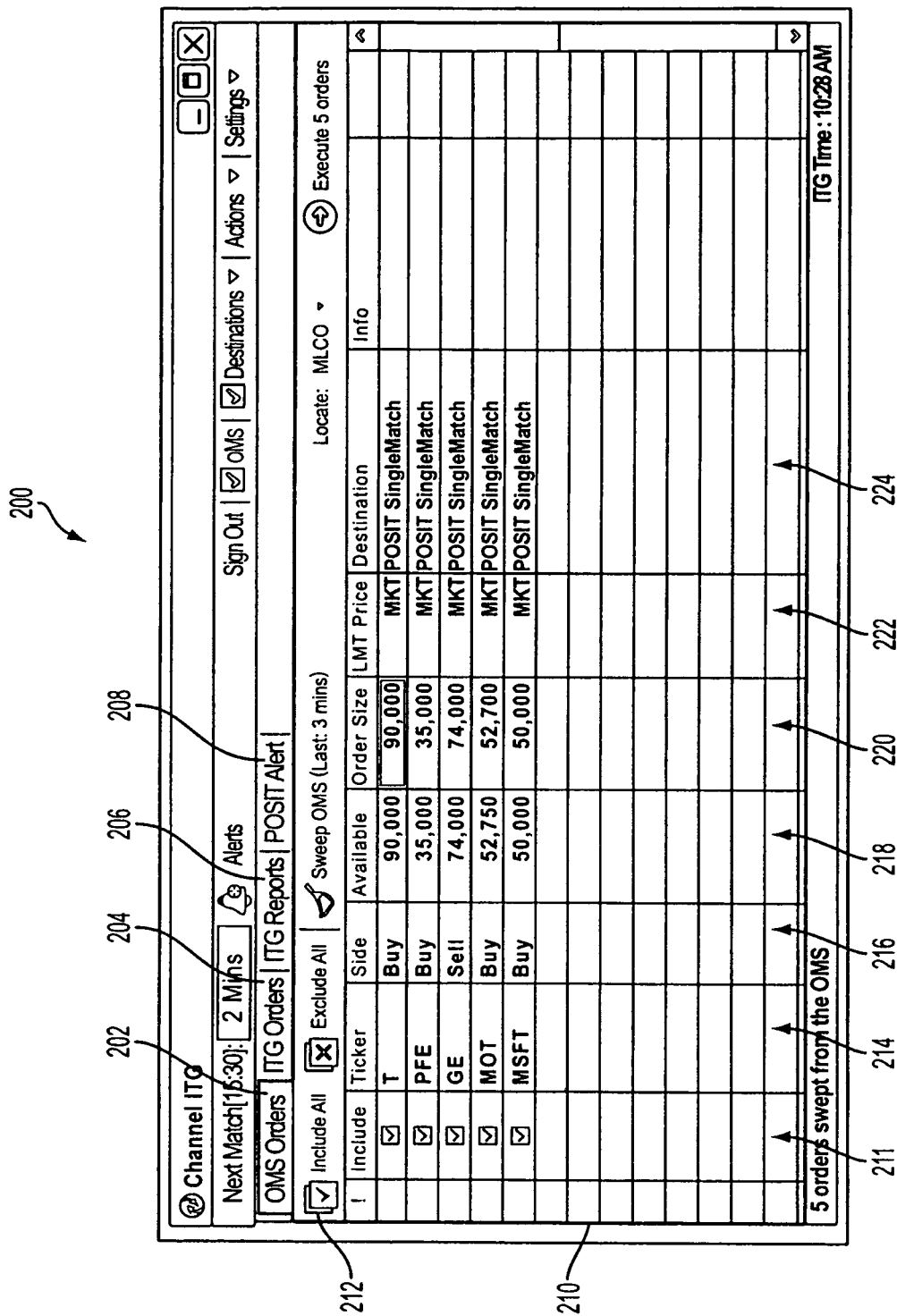

FIG. 2a shows a GUI 200, which includes tabs for accessing an OMS screen blotter 202, active orders 204, reports 206, and indication system 208. A lower block 210 includes the detail information for each tab (here, the OMS blotter tab is active). In the lower block 210 displaying the blotter information, a number of uncommitted trades or indications are shown. Each indication includes the names of the equities 214 along with side 216, size available 218, order size 220, limit price (type of order) 222, and destination of order 224. Also shown, is an "include" check box 212, which allows the user to have the orders on the blotter to "indicate out." A sweeping routine pulls the data regarding each order that has the include check-box 212 checked.

FIG. 2b shows the indication system tab 208 highlighted, and the detailed information in block 210 includes the recently swept information. However, this user is not participating yet and the swept indications are striked-through, meaning that they are not currently indicating out to the system. If participation button 211a is depressed, then the system will indicate out.

Figure 2C:
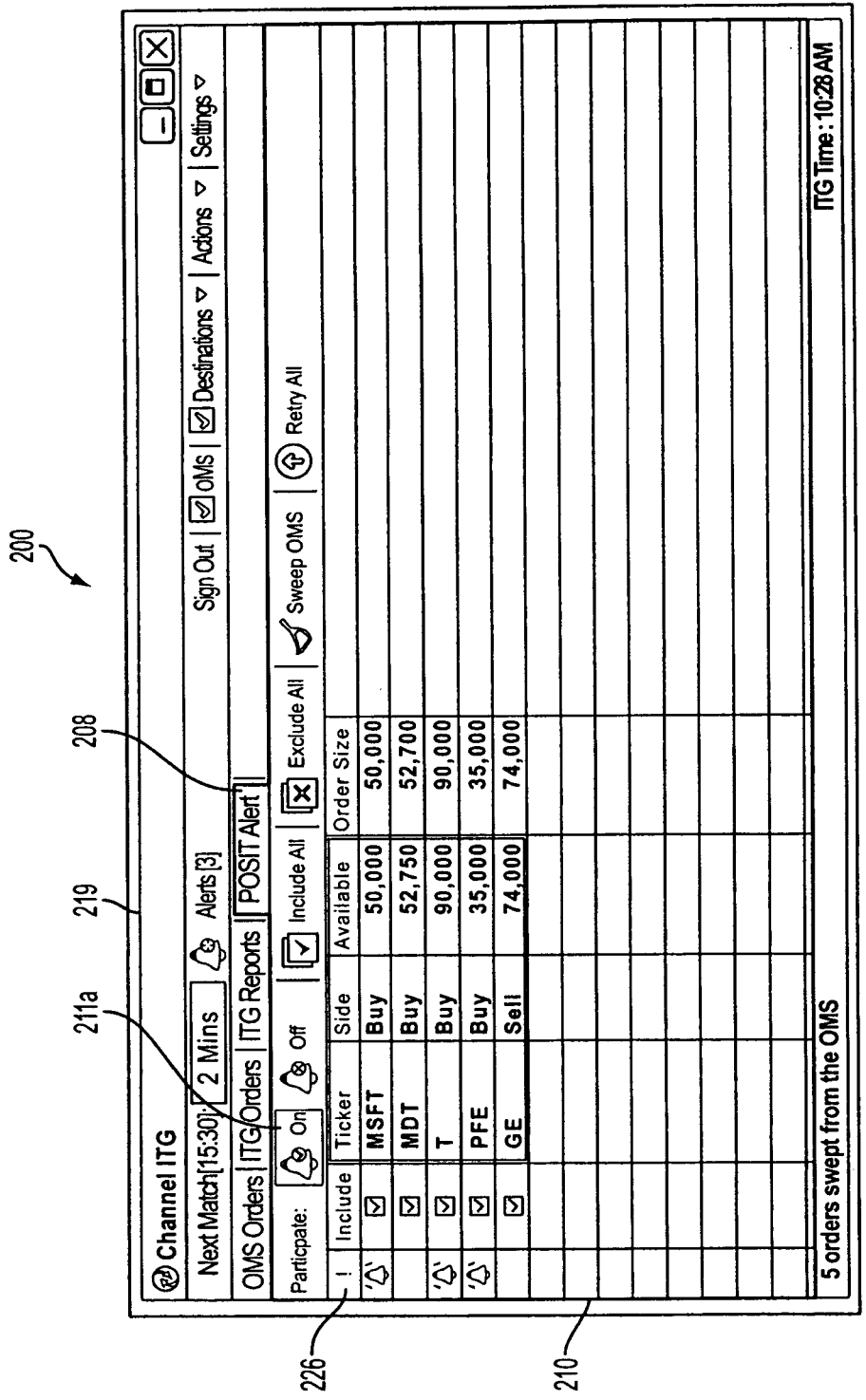

FIG. 2c shows that participation is now on. There is an alert indicator 226 which notifies the user whether a match exists. Note that no other details are given except that a match exists. What this means is that one or more parties can fulfill an order having the parameters of the indications of interest. For example, this user has indicated of interest to buying 50,000 shares of MSFT, 90,000 shares of T, and 35,000 shares of PFE. A match indication 226 means that one or more parties have indications that would complete the orders—indications of interest to sell 50,000 shares of MSFT, 90,000 shares of T and 35,000 shares of PFE. No order is executed here without at least one party on each side making the choice to execute. The number of matches "[3]" is shown in an "alert" button 219.

Figure 2D:
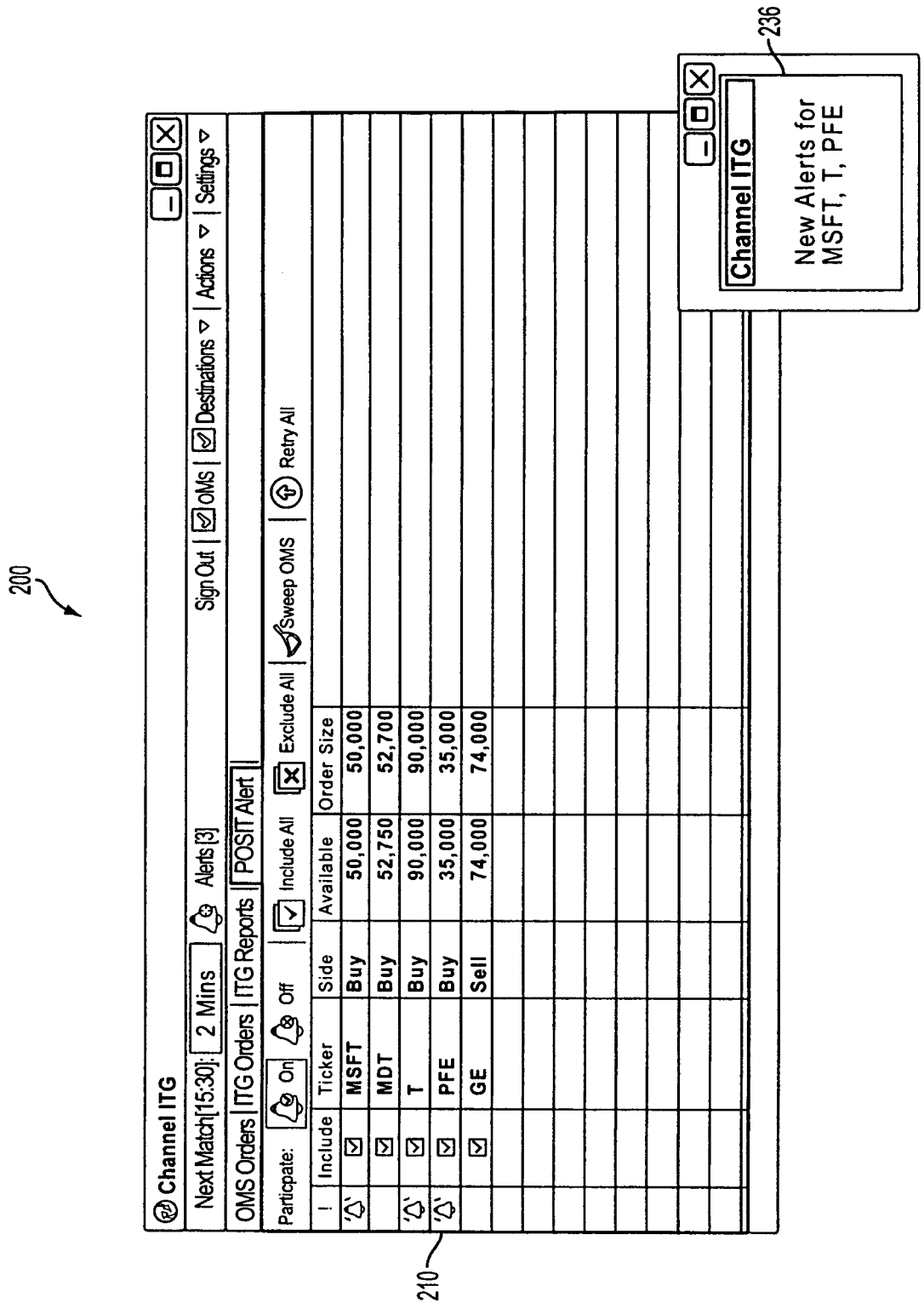
Figure 2E:
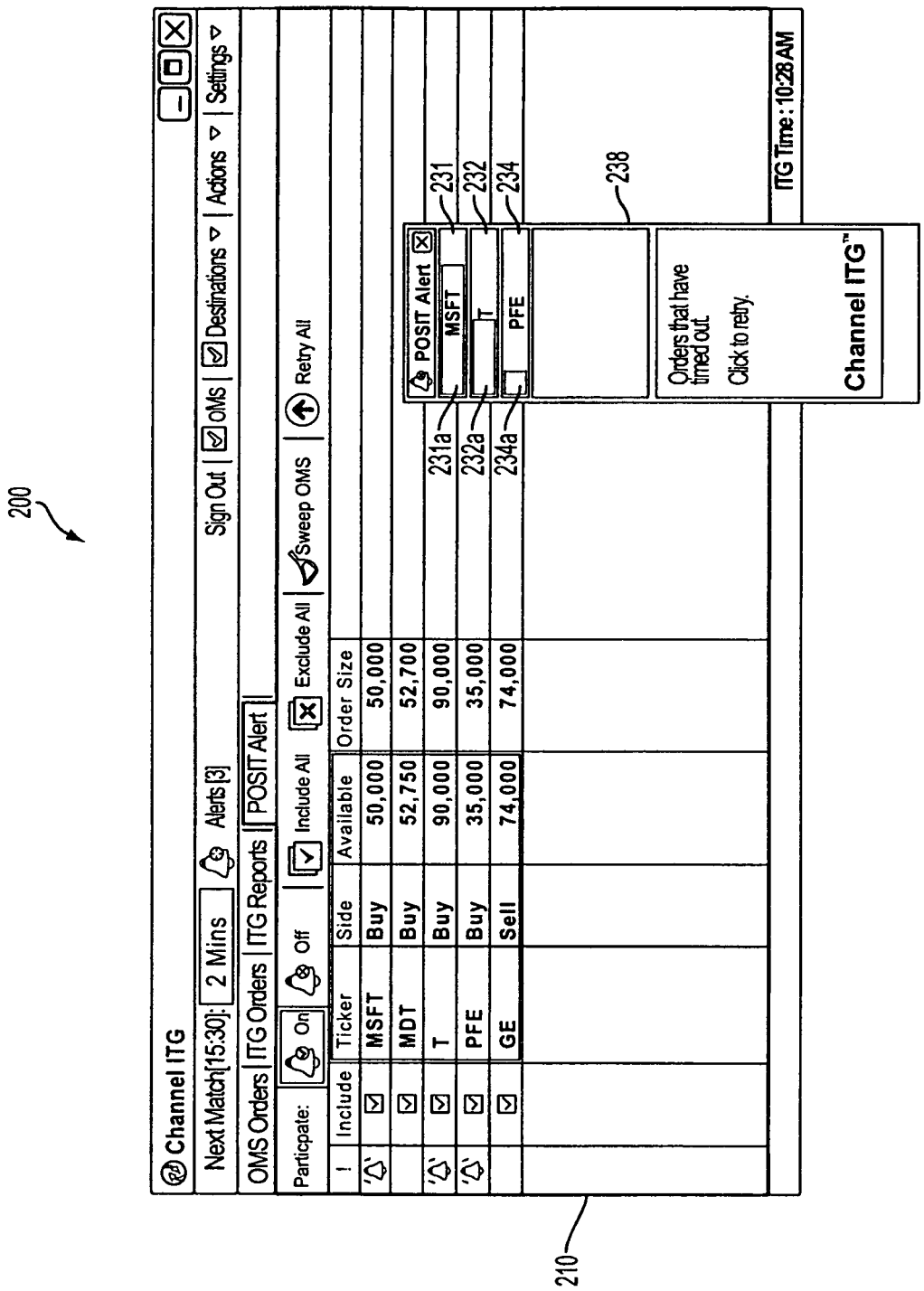
Figure 2F:
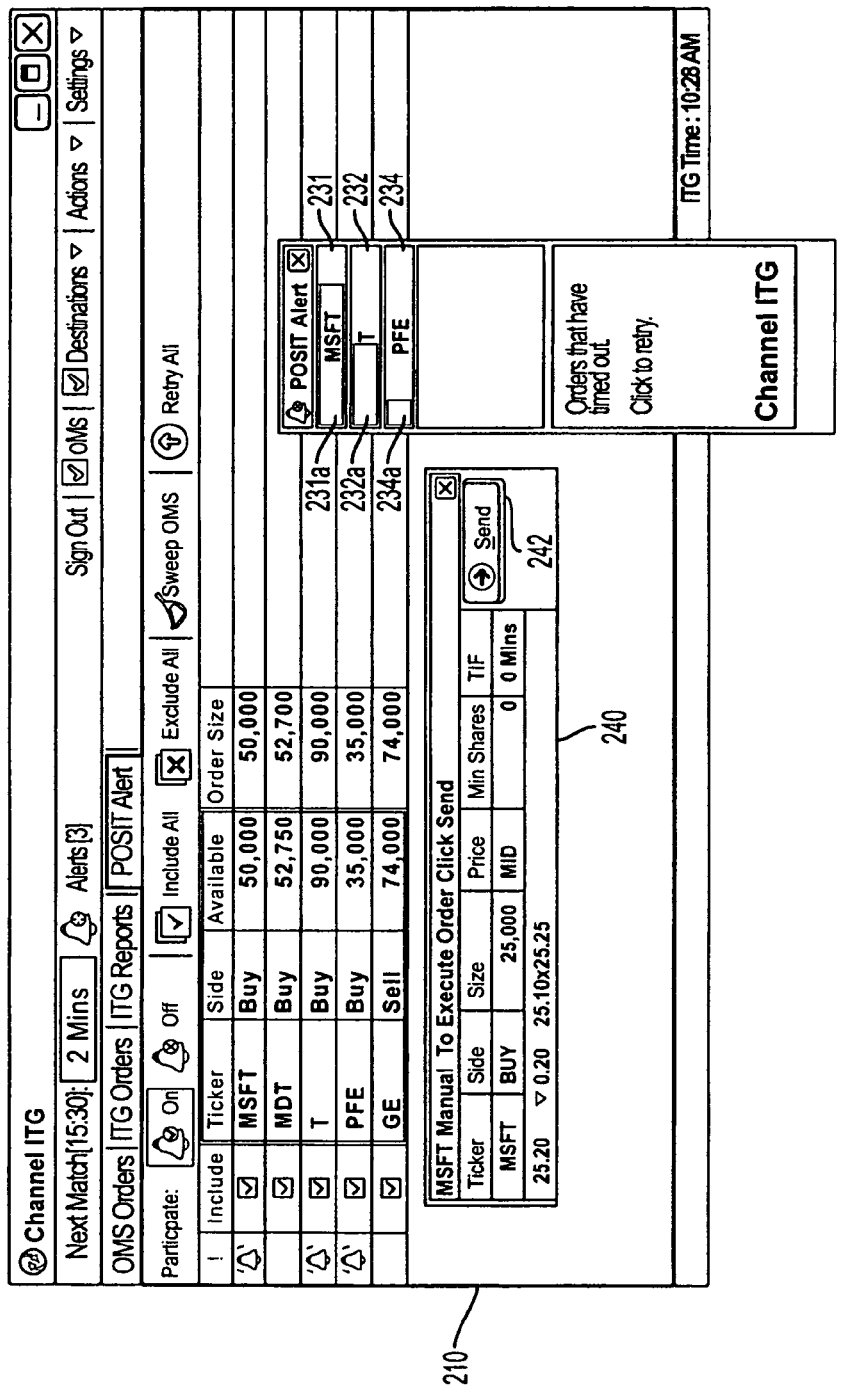

In FIG. 2d, the user is notified of the matches by a pop-up 236. In FIG. 2e, a window 238 shows each match 231, 232, and 234 and the time remaining bars 231a, 232a, and 234a before each match expires and cannot be accepted. As described above, a means for accepting the match and converting the indication of interest into an executable order is provided. In this example, as shown in FIG. 2f, by clicking onto the match (231, 232 or 234), a pop-up window 240 is generated that includes the details of a proposed order. Note here, the order is for less than the entire amount, meaning that the contra-indication is for only 25,000 shares. Optionally, only entire indications could be matched (i.e., only 50,000 shares of MSFT). Also, any amount of data could be shown in pop-up 240 or no data could be shown. Pop-up 240 includes a "send" button 242 that allows the user to accept the match. If the contra-party(s) also accepts the match, the match then is converted to an order and executed.

Figure 2G:
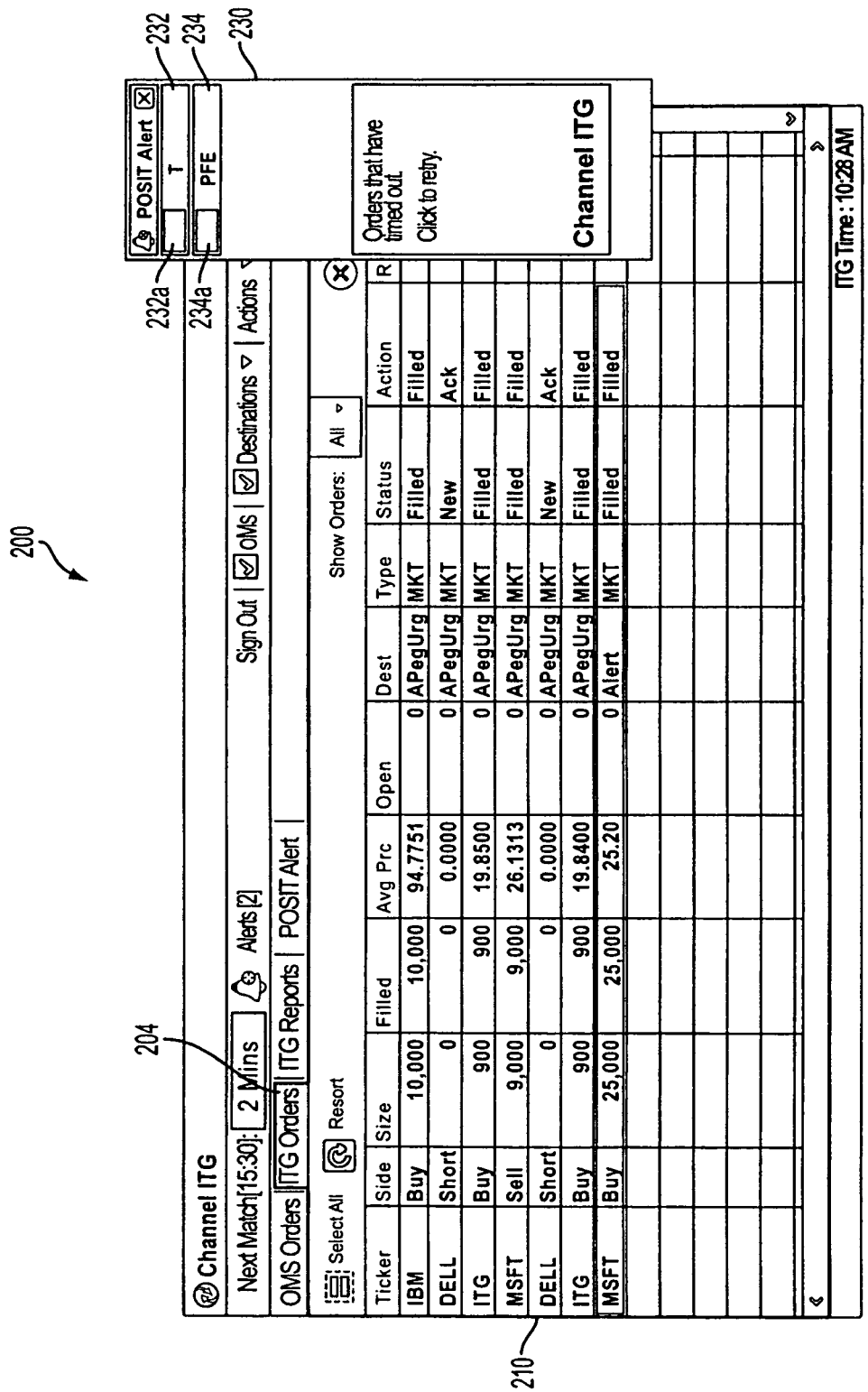

Referring to FIG. 2g, an order screen 204 is shown after the MSFT indication match was accepted. Note that the last order 228 is a filled order for buying 25,000 shares of MSFT generated from an indication of interest. Now only two matches 232 and 234 remain in pop-up window 230.

Figure 2H:
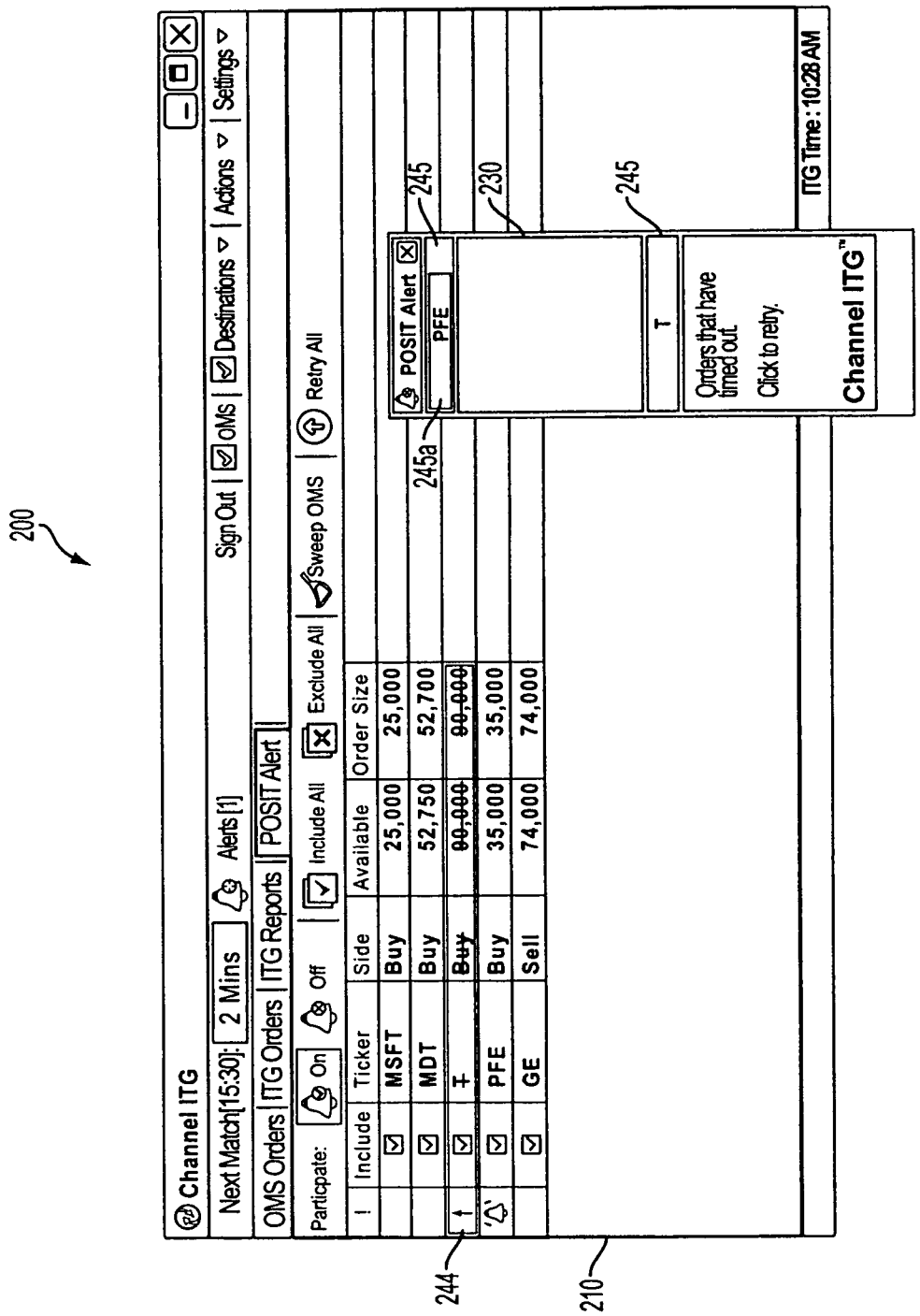

If an match indication (invitation) times out, then the match is terminated (FIG. 2h) and the indication resets (FIG. 2i). In FIG. 2h, the indication 244 for T is stricken when T times out. The match T is shown as expired in a button 245 in pop-up window 230. On the next sweep, as shown in FIG. 2i, T is reinitiated as indicating out.

One skilled in the art will readily understand that the GUI shown in FIGS. 2a-2i is merely exemplary and many other GUI's are contemplated. Further, the functions of the GUI could be changed or implemented with different features. One skilled in the art will understand that the GUI could be implemented with many different types of software or programs, such as with VISUAL BASIC or ORACLE FORMS.

Referring to FIG. 3, a first trading scenario shows one example of the present invention, wherein a buy indication for 100,000 shares of a certain security is entered into the system at 10:15. At 10:22, a sell indication for 40,000 shares of the security is entered. At this time, the potential buyer and potential seller are each alerted to the existence of a potential cross or match. At 10:23, the buyer converts or promotes the indication to an actual order to buy 100,000 shares, and the seller converts or promotes the indication to an actual order to sell 40,000 shares. At 10:24, the system crosses the 40,000 shares of available liquidity at a price that is the mid-point between the current market bid-and-ask prices for the security at issue. Subsequently, the residual amount of 60,000 shares is reverted to an indication of interest only.

Referring to FIG. 4, a second trading scenario shows another example of the present invention, wherein prior to the indication of interest entries, two independent traders have each entered an order on a conventional crossing system to sell a collective total of 50,000 shares. Under this scenario, the traders may choose to participate in the indication of interest pool in the event that a potential cross comes into existence. When the buy indication and sell indication as in Scenario 1 are promoted to actual orders, the preexisting sell orders are allowed to participate in the cross. As a result, a total of 90,000 shares are matched at the mid-point price, with the residual 10,000 shares being reverted to an indication of interest.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

For example, users could be classified by, for example, user profiles, and matching could be limited to users having a specified user profile.

We claim:

1. A computerized system for generating executable trade orders, comprising:
   a computerized non-executable indication of interest matching system coupled with a plurality of client trading computers, each said client trading computer including a trading desktop configured to monitor trades for execution and store unexecuted trading positions to trade a given amount of a tradable asset, and configured to receive from said plurality of client trading computers a plurality of non-executable indications of interest based on the unexecuted trading positions stored by respective trading desktops, to identify as a match one or more first non-executable indications of interest from said plurality of non-executable indications of interest which fulfill one or more second non-executable indications of interest from said plurality of non-executable indications of interest, and, for the identified matches, to provide a trading opportunity notification to said client trading computers from which said matched first and second non-executable indications of interest originated;
   a computerized executable trade order generation systems coupled with each of said plurality of client trading computers and configured to receive instructions to convert the non-executable indication of interest associated with the trading opportunity notification into a binding, executable trade order from said client trading computers that received said trading opportunity notifications, based on said instructions, and to send said binding, executable trade orders to a computerized executable order matching and execution system that is distinct from said computerized non-executable indication of interest matching system,
   wherein said instructions indicate sides and symbols of said executable trade orders to be generated and said sides and symbols are the same as sides and symbols of said matched first and second non-executable indications of interest; and
   wherein said trading opportunity notification expires within a predetermined period of time and includes an indication of said predetermined period of time.

2. The computerized system as recited in claim 1, wherein said computerized executable order matching and execution system includes a pricing module for determining a price at which to execute said binding, executable trade orders corresponding to a match.

3. The computerized system as recited in claim 2, wherein said pricing module calculates a mid-point of a current highest and lowest offer price for a matched symbol, which is used as the price at which to execute said binding, executable trade orders corresponding to a match.

4. The computerized system as recited in claim 1, wherein each said client trading computers includes a graphical user interface for displaying said unexecuted trading positions and said trading opportunity notification.

5. The computerized system as recited in claim 1, wherein each said client trading computer is configured to create a filter definition, and said computerized non-executable indication of interest matching system can only receive unexecuted trading positions which satisfy said filter definition.

6. The computerized system as recited in claim 1, wherein said computerized executable order matching and execution system is further configured to receive a plurality of binding, executable trade orders from each said executable trade order generation system, to identify as a match one or more first binding, executable trade orders from said plurality of binding, executable trade orders with fulfill one or more second binding, executable trade orders from said plurality of binding, executable trade orders, and to execute the matched first and second binding, executable trade orders.

7. The computerized system as recited in claim 4, wherein unexecuted trading positions are anonymous and confidential within said system.

8. The computerized system as recited in claim 4, wherein said graphical user interface includes a dynamic display of said predetermined period of time and an elapsing of said predetermined period of time to indicate an amount of time left to send said binding, executable trade order generation instructions.

9. A computer-implemented method for generating executable trade orders, comprising the steps of:
   at a computerized non-executable indication of interest matching system, receiving, via an electronic data network, a plurality of non-executable indications of interest to trade an amount of a tradable asset, each non-executable indication of interest being associated with a trader;

at the computerized non-executable indication of interest matching system, identifying as a match, one or more first non-executable indications of interest from said plurality of non-executable indications of interest which fulfill one or more second non-executable indications of interest from said plurality of non-executable indications of interest; for said match, providing via said electronic data network, a trading opportunity notification to each party corresponding to the one or more first non-executable indications of interest and one or more second non-executable indications of interest, wherein the trading opportunity notification maintains anonymity and confidentiality of the associated trader of the associated non-executable indications of interest;

at a computerized executable trade order generation system, receiving, via said electronic data network, executable trade order generation instructions from one or more of said parties receiving said trading opportunity notification to convert the non-executable indication associated with the executable trade order generation instructions to a binding, executable trade order, based on said instructions; and electronically sending said binding, executable trade orders to a computerized executable order matching and execution system that is separate from said computerized non-executable indication of interest matching system;

wherein said instructions indicate sides and symbols of said binding, executable trade orders to be generated and said sides and symbols are the same as sides and symbols of said matched first and second non-executable indications of interest; and wherein said trading opportunity notification expires within a predetermined period of time and includes an indication of said predetermined period of time.

10. The computer-implemented method as recited in claim 9, wherein said step of receiving a plurality of non-executable indications includes a step of accessing a plurality of trading desktops and reading unexecuted trading positions stored by each of said plurality of trading desktops, said non-executable indications of interest being based upon said unexecuted trading positions.

11. The computer-implemented method as recited in claim 9, further comprising the steps of:

at said computerized executable order matching and execution system, receiving, via said electronic data network, a plurality of said binding, executable trade orders, identifying as a match one or more first binding, executable trade orders from said plurality of binding, executable trade orders which fulfill one or more second binding, executable trade orders from said plurality of binding, executable trade orders, and executing the matched first and second binding, executable trade orders.

12. The computer-implemented method as recited in claim 9, further including a step of calculating, at said computerized executable order matching and execution system, a price at which to execute said binding, executable trade orders corresponding to a match.

13. The computer-implemented method as recited in claim 12, wherein said step of calculating calculates a mid-point of a current highest and lowest offer price for a matched symbol.

14. The computer-implemented method as recited in claim 9, including a step of displaying said non-executable indications of interest and said trading opportunity notification to the corresponding parties via a client user interface.

15. The computer-implemented method as recited in claim 14, wherein each non-executable indication of interest includes a size of a trade, an asset name of an asset to be traded, and a side of the trade.

16. The computer-implemented method as recited in claim 14, wherein said non-executable indications of interest can be based on executable or nonexecutable orders.

17. The computer-implemented method as recited in claim 14, wherein said graphical user interface includes a dynamic display of said predetermined period of time and an elapsing of said predetermined period of time to indicate an amount of time left for said trading opportunity notification.

* * * * *